United States Patent
Muise et al.

(10) Patent No.: US 12,054,882 B2
(45) Date of Patent: Aug. 6, 2024

(54) MODULAR AMBULATORY SURFACE

(71) Applicant: Ambulatory Innovations Inc., Lowell, MA (US)

(72) Inventors: Katherine Mary Muise, Saugus, MA (US); Michelle Jane Mailloux, Lowell, MA (US)

(73) Assignees: Katherine Mary Harrington, Saugus, MA (US); Michelle Jane Mailloux, Lowell, MA (US)

( * ) Notice: Subject to any disclaimer, the term of this patent is extended or adjusted under 35 U.S.C. 154(b) by 412 days.

(21) Appl. No.: 17/099,177

(22) Filed: Nov. 16, 2020

(65) Prior Publication Data

US 2021/0148043 A1 May 20, 2021

Related U.S. Application Data

(60) Provisional application No. 62/937,088, filed on Nov. 18, 2019.

(51) Int. Cl.
*D06N 7/00* (2006.01)
*A47G 27/04* (2006.01)
*B32B 3/06* (2006.01)
*B32B 3/18* (2006.01)

(52) U.S. Cl.
CPC ....... *D06N 7/0007* (2013.01); *A47G 27/0481* (2013.01); *B32B 3/06* (2013.01); *B32B 3/18* (2013.01)

(58) Field of Classification Search
CPC ............ A47G 27/0293; A47G 27/0218; A47G 27/281; A47G 27/0412; D06N 7/0005; D06N 7/0007; D06N 7/0036; D06N 7/0055; D06N 7/0057; B32B 3/02; B32B 3/06; B32B 3/10; B32B 3/16; B32B 3/18
See application file for complete search history.

(56) References Cited

U.S. PATENT DOCUMENTS

| | | | | |
|---|---|---|---|---|
| 5,066,000 A | * | 11/1991 | Dolan | A63B 23/0464 472/92 |
| 2006/0127647 A1 | * | 6/2006 | Thrush | B32B 3/10 428/172 |
| 2014/0220265 A1 | * | 8/2014 | Stoll | E04F 15/22 428/17 |
| 2014/0302973 A1 | * | 10/2014 | Fitterer | A63B 23/0464 482/142 |
| 2017/0296862 A1 | * | 10/2017 | Figone | A63B 23/10 |
| 2018/0240350 A1 | * | 8/2018 | White | G09B 1/36 |

* cited by examiner

*Primary Examiner* — Nancy R Johnson
(74) *Attorney, Agent, or Firm* — Armis IP Law, LLC

(57) ABSTRACT

A modular ambulatory surface exhibits terrain variations for emulating a walking surface for ambulatory rehabilitation. Ambulatory mobility, or basic walking from alternated leg movements, is one of the most basic capabilities enjoyed by humans, and therefore can be devastating if suddenly compromised. A number of modular surfaces each exhibit different terrain qualities, and are joined together according to a prescribed sequence of desired, rehabilitative terrain. A flexible or resilient walking surface encapsulates shaped, load bearing elements that define the rehabilitative walking surface. Joinable edges have a pattern of protrusion, receptacles or similar fixtures for coupling to an adjacent module. A series of joined, modular surfaces allows simulation of an outdoor surface and variations thereof that are otherwise difficult to provide in a modern commercial facility with fixed planar flooring.

13 Claims, 6 Drawing Sheets

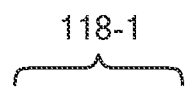 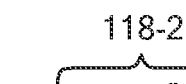 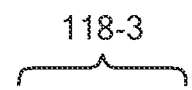 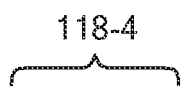
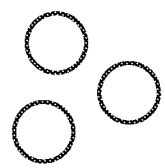 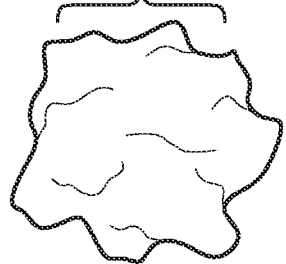 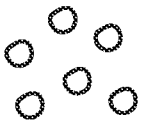 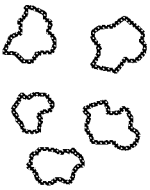
*FIG. 6A*   *FIG. 6B*   *FIG. 6C*   *FIG. 6D*
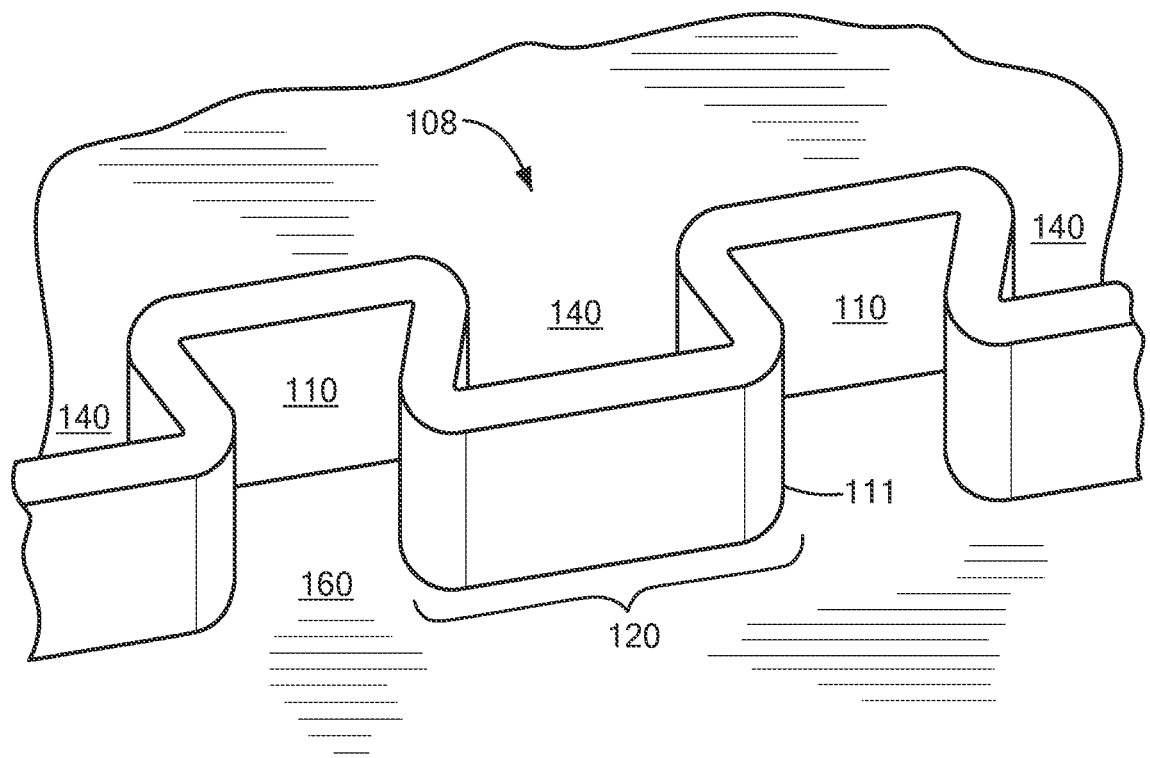
*FIG. 7*

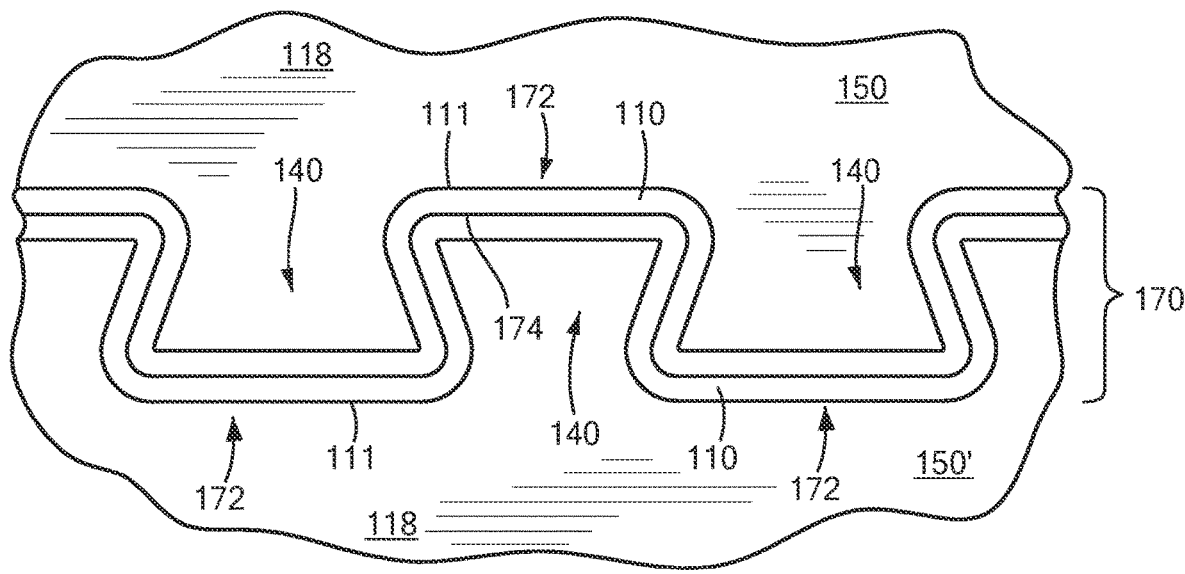
*FIG. 8*
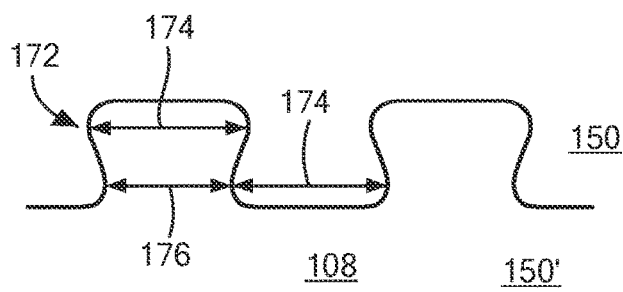
*FIG. 9A*
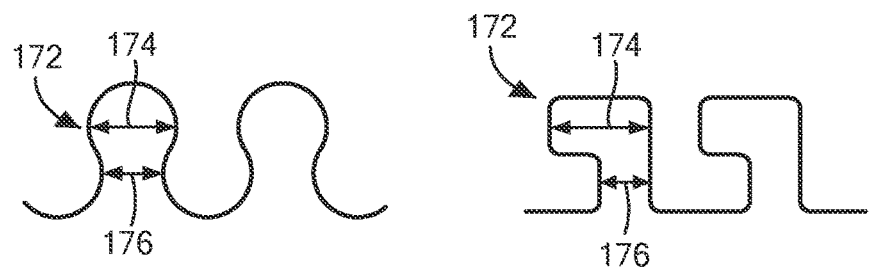
*FIG. 9B*   *FIG. 9C*

MODULAR AMBULATORY SURFACE

RELATED APPLICATIONS

This patent application claims the benefit under 35 U.S.C. § 119(e) of U.S. Provisional Patent App. No. 62/937,088, filed Nov. 18, 2019, entitled "AMBULATION TRAINING MAT," incorporated herein by reference in entirety.

BACKGROUND

A multitude of medical and health disorders can affect basic motor and ambulatory skills in a limiting manner. Events such as strokes, brain/CNS (central nervous system) injury, musculoskeletal trauma and others can leave a patient's ambulatory capabilities in a compromised state, despite adequate mental capability. Fortunately, rehabilitation and physical therapy capabilities are an expanding medical field, and substantial resources exist for patients suffering from compromised ambulatory mobility.

SUMMARY

A modular ambulatory surface exhibits terrain variations for emulating a walking surface for ambulatory rehabilitation. Ambulatory mobility, or basic walking from alternated leg movements, is one of the most basic capabilities enjoyed by humans, and therefore can be devastating if suddenly compromised. Multiple modular ambulatory surfaces exhibit different terrain qualities, and are joined together according to a prescribed sequence of desired, rehabilitative terrain. A flexible or resilient walking surface encapsulates shaped, load bearing elements that define the simulated rehabilitative terrain. Joinable edges of each module have a pattern of protrusion, receptacles or similar fixtures for coupling to an adjacent module. A series of joined, modular surfaces allows simulation of an outdoor surface and variations thereof that are otherwise difficult to provide in a modern commercial facility with fixed planar flooring.

Gait training is a particularly beneficial treatment for ambulatory degradation due to injury, aging, or physiological degradation of musculoskeletal tissue. The modular ambulatory surface is readily adapted for use in gait and balance training for rehabilitation of a person with gait impairments. Each module includes a flexible shell surrounding polymeric filling that simulates uneven surfaces, reducing the retraining time for patient ambulation. The full system defines an interlocking device which allows for modular usage in a variety of settings.

Configurations herein are based, in part, on the observation that conventional approaches to gait training rehabilitation occur in medical facilities such as doctor's offices and hospital settings. Unfortunately, conventional approaches suffer from the shortcoming that interior flooring in such facilities, as with many commercial spaces, is simply a solid, level planar surface which is actually ideal for most walking scenarios, but does little to prepare a patient for other surfaces which they may encounter such as dirt, sand, gravel and rocks. Uneven and granular surfaces may be likely to occur outside of a clinical setting.

Accordingly, configurations herein provide a lightweight, modular gait training mat device to help develop ambulation and balance in patients with walking disabilities. The disclosed approach employs an outer shell of flexible material, such as elastomers, flexible polymers, foam, and/or fabric, in the form of an interlocking shape that allows for individual modular elements to interlock and form a larger region for patient ambulation. The flexible shell may be hollow or filled with liquids of various viscosities or solid materials, such as sand or other bead-type, textured or other materials on the mat interior and is connected to a solid base with a non-skid coating to prevent slippage. The shell is packed with a polymeric filling that when subject to the force of the patient's foot strike will simulate targeted uneven terrain.

In further detail, configurations herein present an ambulatory rehabilitation device and system adapted for simulation of a terrain surface. A plurality of opposed planar surfaces encloses a void receptive to a terrain simulation medium, such that at least one of the opposed planar surfaces being flexible for deformation based on the terrain simulation medium enclosed in the void. The opposed planar surfaces align at a perimeter of each of the opposed planar surfaces for forming a sidewall coupling the opposed planar surfaces along the aligned perimeter for defining a modular terrain element. Each modular terrain element includes a row of engaging structures along the sidewall adapted to engage a sidewall of an adjacent modular terrain element for forming a continuous simulated terrain surface by linking multiple modular terrain elements in succession.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 6A-6D show examples of the terrain simulation medium depicted in FIG. 4;

FIG. 7 shows a perspective view of the sidewall of the modular terrain element of FIGS. 1-5 forming the interior of the interlocking engaging structures;

FIG. 8 shows the interlocking zone between adjacent, engaged modular terrain elements; and FIGS. 9A-9C show alternate configurations of the engaging structures.

DETAILED DESCRIPTION

Depicted below are several examples of various configurations of the ambulatory and gait rehabilitation device. Numerous neurological and musculoskeletal issues can cause loss of ambulation in numerous patients. When a patient's ambulation is impaired, balance and gait training are the most constructive forms of therapeutic care. The principles of neuroplasticity dictate that in order for a patient to master a skill, they need to practice that skill. Previous studies have supported that having patients practice walking outdoors on uneven surfaces leads to improved outcomes and reduced recovery time for regaining ambulation. Due to various environmental, logistical, and/or legal reasons, therapists are often unable to take patients outside to practice walking outdoors. Since patients are often unable to practice walking on real outdoor terrain, it would be beneficial for them to practice on an artificial surface in a safe, monitored environment.

Configurations disclosed below provide a modular element that takes the form of a mat with an interlocking ability to form a larger walkway for patient ambulation. A plurality of mats, each having a specific terrain type it is to emulate, may be assembled or configured across a floor area based on a modular pattern of the desired rehabilitative terrain.

Figure 1:
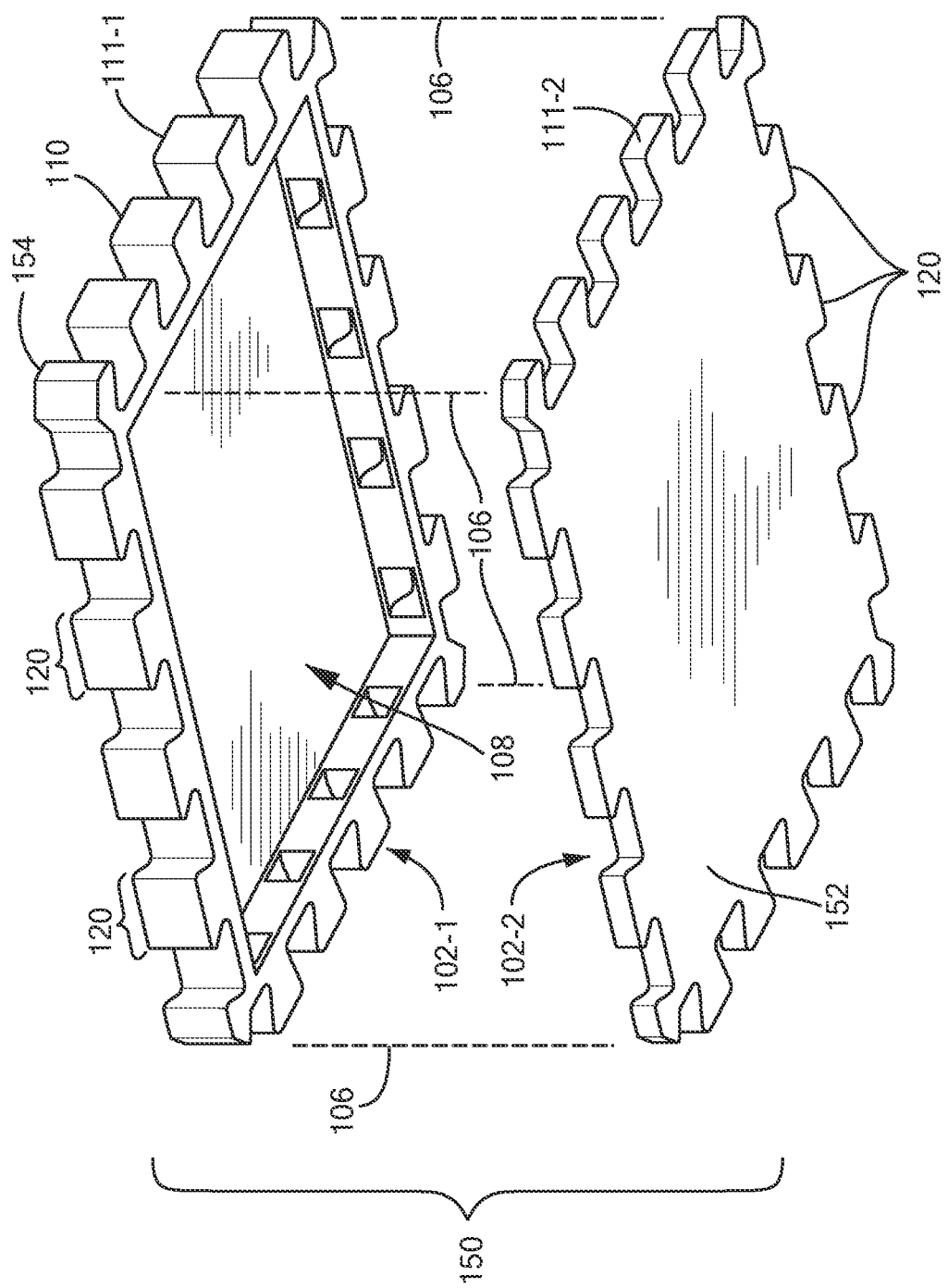
FIG. 1 is an exploded view of a modular terrain element suitable for use with configurations of the ambulatory surface terrain simulation system as disclosed herein.

FIG. 1 is an exploded view of a modular terrain element 150 suitable for use with configurations of the ambulatory surface terrain simulation system as disclosed herein. Referring to FIG. 1, in a basic configuration, an ambulatory rehabilitation device is adapted for simulation of a terrain surface by interlocking modules, or mats, each simulating a particular type of terrain. Each of the modules includes a plurality of opposed planar surfaces 102-1 . . . 102-2 (102 generally) enclosing a void 108 receptive to a terrain simulation medium, such that at least one of the opposed planar surfaces 102 is flexible for deformation based on the terrain simulation medium enclosed in the void 108. The opposed planar surfaces 102 are aligned at a perimeter 111-1 . . . 111-2 (111 generally) of each of the opposed planar surfaces 102, shown by dotted lines 106 aligning the corners of each of the generally square planar surfaces 102. At least one of the opposed planar surfaces has a sidewall 110 for coupling the opposed planar surfaces along the aligned perimeter for defining a modular terrain element 150. In the example of FIG. 1, the planar surfaces 150 include a base 152 and a therapeutic surface 154, discussed further below.

Figure 2:
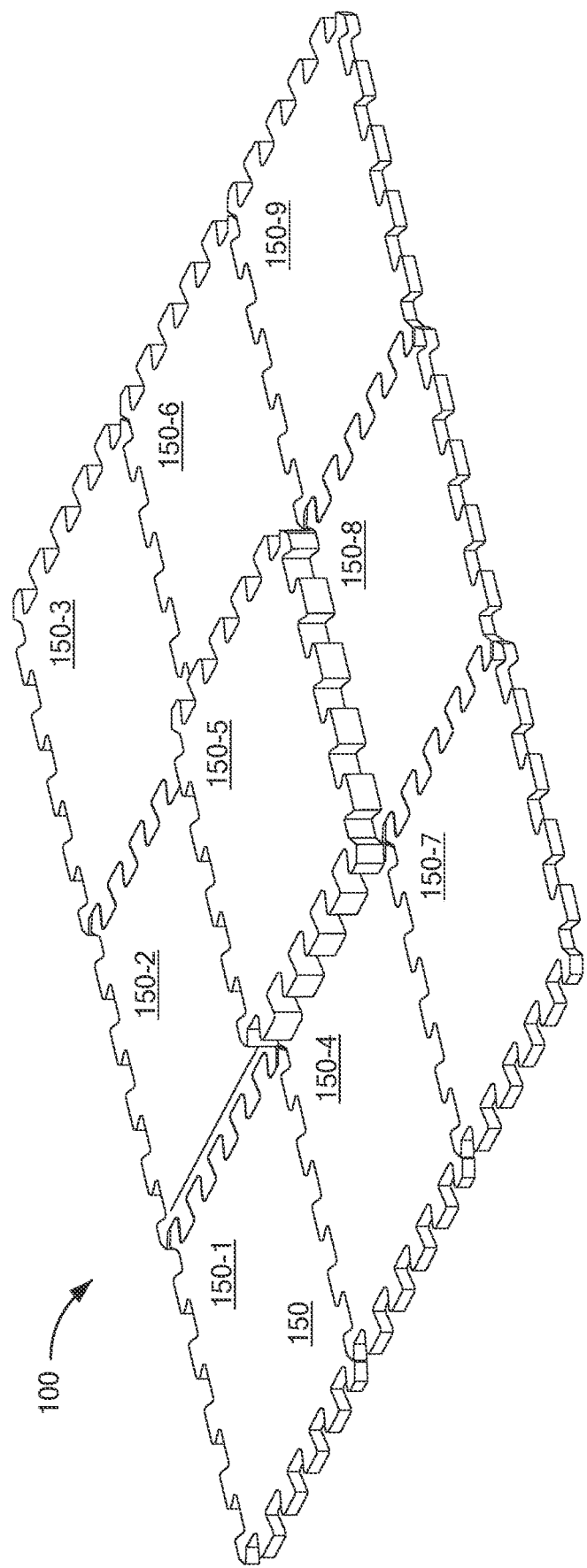
FIG. 2 is a plurality of modular terrain elements of FIG. 1 engaged in an interlocking manner.

FIG. 2 is a plurality of modular terrain elements of FIG. 1 engaged in an interlocking manner. Referring to FIGS. 1 and 2, the perimeter of the opposed planar surfaces 102 defines an engaging structure 120 along the sidewall 110 adapted to engage a sidewall 110 of an adjacent modular terrain element 150' for forming a continuous simulated terrain surface 100. A plurality of modular terrain elements 150-1 . . . 150-9 (150 generally) may be joined via the plurality of engaging structures 120 adapted to interlock with the engaging structures on the adjacent modular terrain element 150' in the continuous simulated terrain surface 100.

In the example shown in FIGS. 1 and 2, the engaging structures 120 are generally symmetrical with the adjacent modular terrain element 150' allowing an interlocking tiled pattern to emerge. The sidewalls 110 have a width that defines a height and volume of the void 108, discussed further below. The symmetry of the interlocking engaging structures allows placement even in an enclosed location such as modular terrain element 150-5 being inserted in a centered arrangement around modular terrain elements 150-1 . . . 150-4 and 150-6 . . . 150-9.

Figure 3:
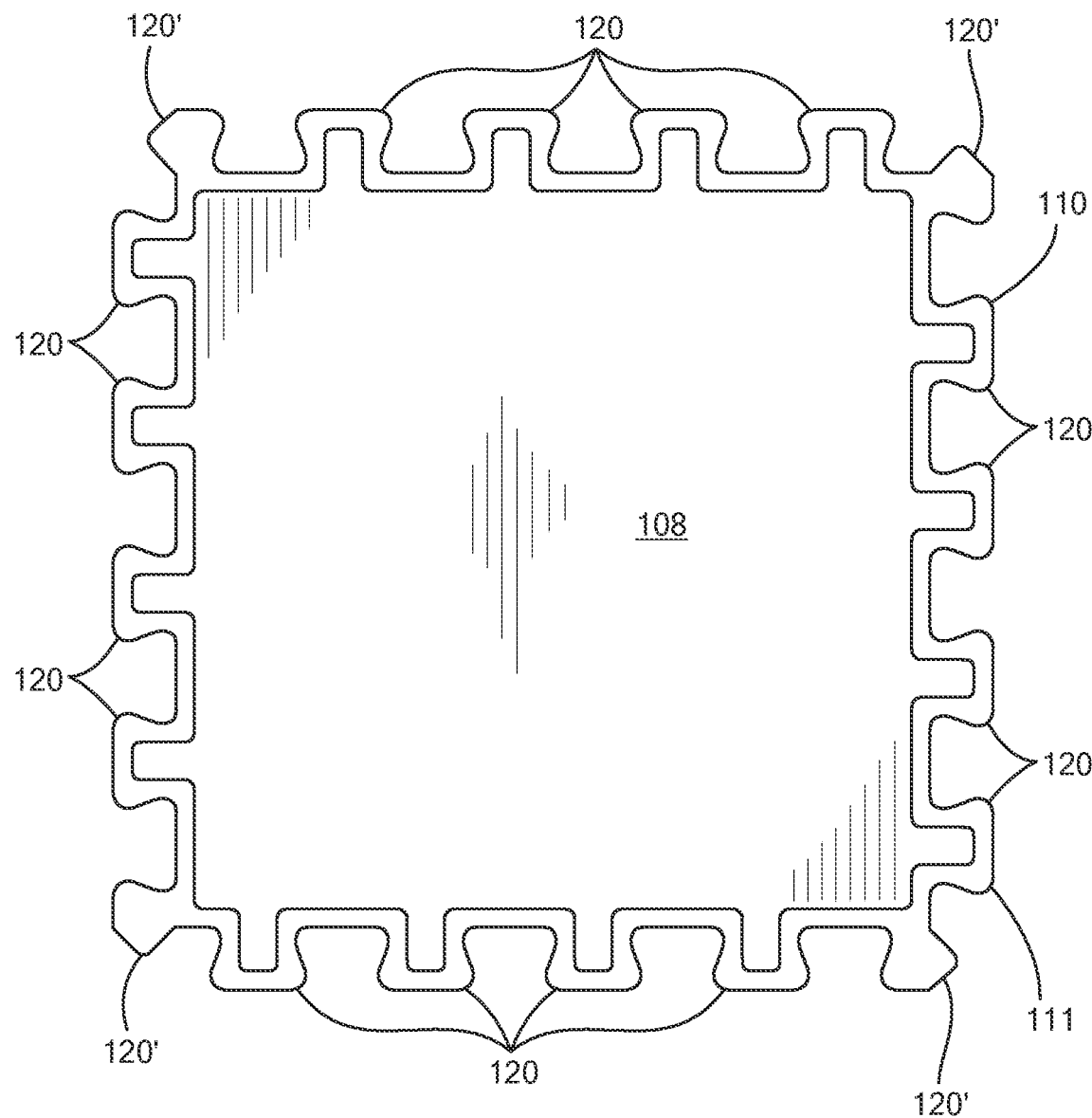
FIG. 3 is a plan view of the modular terrain element of FIGS. 1 and 2.

FIG. 3 is a plan view of the modular terrain element 150 of FIGS. 1 and 2. Referring to FIGS. 1-3, the engaging structure 120 is defined by a plurality of engaging structures 120 having a complementary shape for engaging the adjacent modular terrain element 150'. Any suitable number of engaging structures may be provided. Positional anomalies such as corner structures 120' may also be provided by symmetric or complementary arrangement with the adjacent modular terrain element 150. The sidewall 110 extends around the perimeter 111 including the inversion of the engaging structure 120, forming a void 108 that extends to the limits of the perimeter 111.

Figure 4:
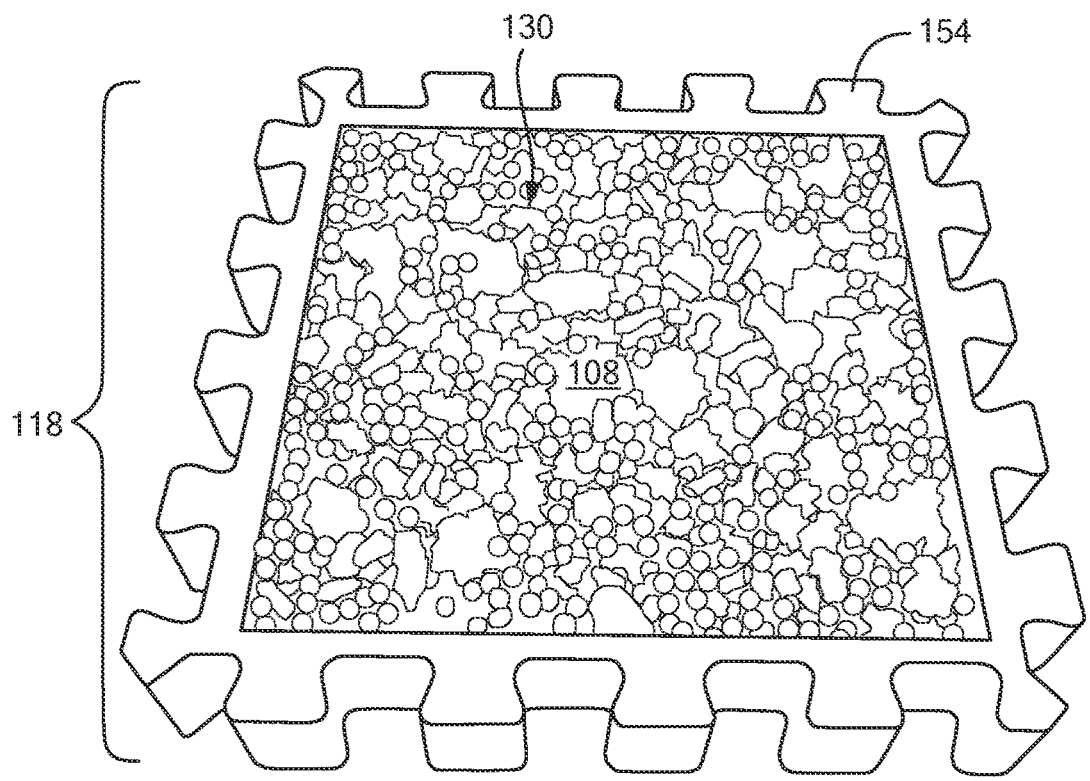
FIG. 4 shows the modular terrain element of FIG. 3 filled with a terrain simulation medium.

FIG. 4 shows the modular terrain element of FIG. 3 filled with a terrain simulation medium 130 occupying the void 108. Generally, the void 108 is integrated in the therapeutic surface 154 by the sidewall 110 which is filled with the simulation medium, bonded, glued or fused to the base 152. Once assembled, the modular element 150 is deployed by inverting the module base 152 side down. Referring to FIGS. 1-4, the terrain simulation medium 130 further comprises a plurality of filler objects 118, such that each of the filler objects 118 has a size and a texture for slidable communication with adjacent filler objects, discussed further below with respect to FIGS. 6A-6D. Briefly, the filler objects 118 are adapted for exerting a compressive force in response to deformation of the opposed planar surfaces 120, as an ambulatory patient walks on the continuous simulated terrain surface 100 formed from the network of interconnected modular terrain elements 150. An ambulatory patient bears body weight on the topmost of the opposed planar surfaces 102, which deformably compresses onto the terrain simulation medium 130 in the void 108 beneath the surface 102, where the array of filler objects 118 returns a possibly irregular and/or uneven force consistent with the type, granularity and viscosity of terrain it emulates.

Referring to the specific construction in one particular configuration, in FIGS. 1-4, the opposed planar surfaces further include a base 152 for communication with an underlying surface such as the facility floor, and a therapeutic surface 154, such that the therapeutic surface 154 is opposed from the base 152 and adapted for engaging a patient. The therapeutic surface 154, in communication with the ambulatory patient, has a deformability limited by the terrain simulation medium 130 for providing an ambulatory resistance to patient imposed downward force. The base may have a non-slip or frictional treatment if not sufficiently fixed on the floor, and the therapeutic surface may be similarly treated or textured for an appropriate underfoot surface.

Figure 5:
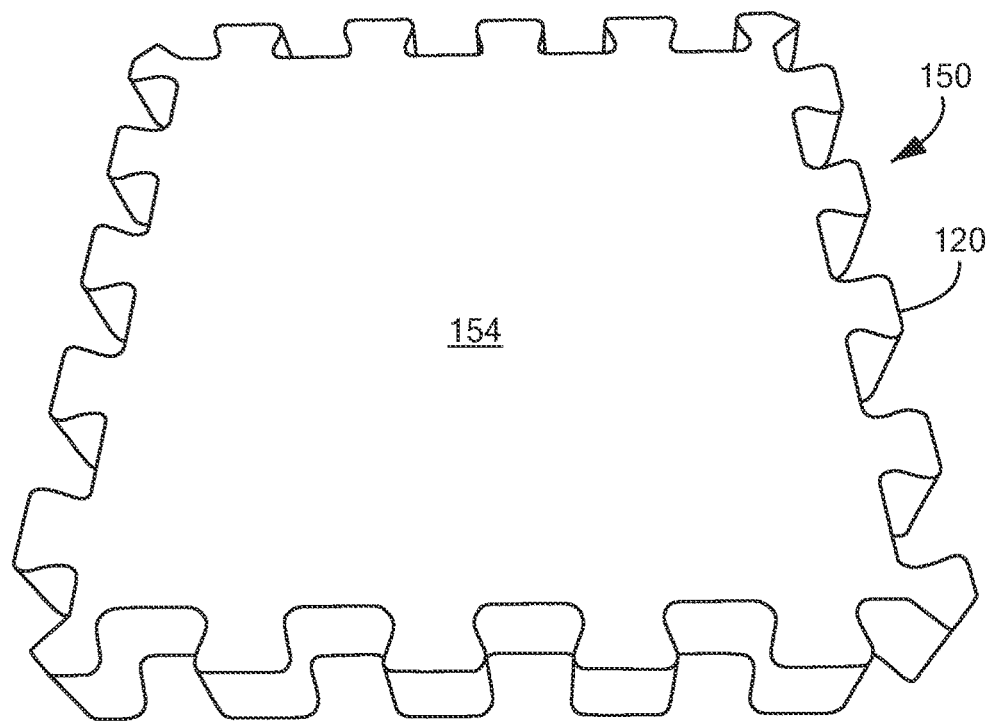
FIG. 5 shows the enclosed terrain simulation medium in the modular terrain element of FIG. 4.

FIG. 4 shows the enclosed terrain simulation medium 130 sealed in the void 108 of the modular terrain element 150 of FIG. 5. Continuing to refer to FIGS. 1-5, as the therapeutic surface 154, already having the sidewall 110 attached, descends on the base 152, void 108 is closed between the therapeutic (top) surface 154. In practice, filling the void 108 with the terrain simulation medium 130 while the therapeutic surface 154 is inverted, and then applying the base 152, and inverting (flipping) again to reveal the therapeutic surface 154 facing upwards as in FIG. 5 provides a simpler assembly. Fusion of the sidewall 110 to the therapeutic surface 154 may provide a stronger bond, if the base 152 is later joined by an alternate means after filling. Whatever the formation, the completed modular terrain element 150 includes the opposed surfaces 102 defined by the therapeutic surface 154 and the base 152 in a parallel arrangement separated by and joined to the sidewall 110 and filled with the terrain simulation medium 130 corresponding to a particular terrain type. The therapeutic surface 154 is deformable and resilient so as to transmit the counterforce imposed by the terrain simulation medium 130, and the base 152, which may be of the same material as the therapeutic surface, rests on the floor of the facility, likely a concrete or rigid wood floor in a substantially flat arrangement.

FIGS. 6A-6D show examples of the terrain simulation medium depicted in FIG. 4. Any suitable materials may be employed for terrain simulation; among the more prevalent simulation objectives are sand, grass and gravel, however any granular, eccentrically shaped solid and/or liquid may be employed for providing an intended surface resiliency and viscosity. Referring to FIGS. 6A-6D, FIG. 6A shows a generally spherical set of filler objects 118-1, FIG. 6B shows a large, course sided filler object 118-2, FIG. 6C shows a smaller, more granular spherical filler object 118-3, and FIG. 6D shows small, course or irregular edged filler objects 118-4 (all 118 generally). Combinations of filler objects 118 may also, of course, be provided. Consideration may also be given to frictional communication between the filler objects 118, as circular, smoother sides tend to slidably engage and move past each other, while course or pointed edges tend to engage and remain in a fixed adjacency to a compressive force.

FIG. 7 shows a perspective, cutaway view of the sidewall of the modular terrain element of FIGS. 1-5 forming an interior 140 of the interlocking engaging structures 120. Referring to FIGS. 1-7, the sidewall 110 follows the perimeter 111 of the therapeutic surface 154 and the base 152, which are generally aligned such that the sidewall 110 runs normal to each, or vertically when the base 152 rests horizontally on a facility floor 160. The void 108 extends to the interior 140 forming a continuous volume for fill by the terrain simulation medium 130. The sidewall 110 is adapted to exert a resilient force against the patient foot strike deformation that is less than that exerted by the terrain simulation medium 130. In other words, the sidewall 110 should not exert an upward force against the patient's foot that is greater than the filler objects 118, lest the engaged modular terrain elements 150, 150' impose a rigid line or "hump" at the transition between elements 150. In other words, the sidewall 110 deforms along with the therapeutic surface 154 until compressed sufficiently to rest on the filler objects 118 for exerting a counterforce for simulating terrain. Filling the interior 140 in addition to the void 108 ensures a consistent continuous simulated terrain surface 100 as a number of elements 150 are joined. Alternatively, the elements 150 may employ solid engaging structures as in FIG. 4 for strengthening attachment between modular terrain elements 150 if desired.

FIG. 8 shows the interlocking zone 170 between adjacent, engaged modular terrain elements 150, 150'. Referring to FIGS. 1-8, each of the engaging structures 120 define protrusions 172 based on the aligned perimeters 110 of the base 152 and therapeutic surfaces 154. Once multiple modular terrain elements 150, 150' are assembled into a simulated terrain surface 100 by plurality of the engaging structures 120, the protrusions 172 define an interlocking zone 170, such that the interlocking zone 170 includes protrusions from an adjacent modular terrain element 150' at a separation 174 between elements 150, 150'. As indicated above, in the interlocking zone 170, the void 108 extends into an interior 140 of the engaging structures 120, such that the interior of the engaging structures 120 is filled with the terrain simulation medium 130 for extending the deformability of the therapeutic surface 154 to the interlocking zone 170. In other words, the interlocking zone 170 between the individual elements 150 has the same or similar "feel" of upward resistance as the field of the void 108 away from the sidewalls 110.

Upon joining elements 150, 150' by engaging the protrusions 172 in an alternating manner, the sidewalls 110 of each contact at the separation 174. The deformability of the sidewalls 110 nonetheless allows the patient weight to be borne by the filler objects 118 in the interior 140 just as the filler objects 118 in the void 108. This provides an apparent seamless simulated terrain surface of a common type when the joined elements 150 exhibit the same terrain simulation medium 130, and nonetheless avoid a demarcation of increased tension or resistance when the elements 150 contain a different terrain simulation medium 130.

FIGS. 9A-9C show alternate configurations of the engaging structures. Referring to FIGS. 7-9C, the protrusions 172 may take a variety of forms. In general, the full module 150 and protrusions 172 is such that the engaging structures define a tessellation of shapes so as to fit together in a continuous manner, much like a completed jigsaw puzzle. The engaging or locking effect of the protrusions 172 is such that the protrusions define regions of greater cross section 174 tapered to a region of lesser cross section 176, illustrated as different shapes in FIGS. 9A-9C. The engaging arrangement results from the protrusions 172 having an region of lesser cross section 176 and a region of a greater cross section 174, such that the region of lesser cross section 176 is proximate to the void 108 and the region of greater cross section 174 is more distal from the void 108. Engagement between the elements 150, 150' is fixed because the region of greater cross section 174 engages in an interference fit with the region of greater cross section 174 of the adjacent modular terrain element 150'. Various other configurations and shapes for complementary engagement may be included, such as the protrusion 172 of FIG. 9C.

Alternate configurations in addition to the specific configurations illustrated and described above may be envisioned for providing the system for ambulatory gait training by forming simulated terrain surface 100 formed from the network of interconnected modular terrain elements 150. For example, the perimeter 110 may define an angled or overlapping sidewall with an adjacent module 150, and need not be normal or perpendicular to the facility floor 160.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An ambulatory rehabilitation device, the ambulatory rehabilitation device adapted for simulation of terrain, comprising:
   a pair of opposed planar surfaces including a base and a terrain surface panel enclosing a void containing a terrain simulation medium, at least one of the opposed planar surfaces being flexible for accommodating deformation based on the terrain simulation medium enclosed in the void,
   the base and terrain surface panel aligned at a respective perimeter;
   a sidewall coupling the base and terrain surface panel along the aligned perimeter for enclosing a flexible shell around the void for defining a modular terrain element; and
   a plurality of engaging structures along the sidewall adapted to engage complementary engaging structures on a sidewall of an adjacent modular terrain element for forming a continuous simulated terrain surface, each engaging structure of the plurality of engaging structures defining an interlocking zone, the interlocking zone receptive to engaging structures from an adjacent modular terrain element,
   the void extending into an interior of the engaging structures, the void and the interior of the engaging structures forming a continuous volume filled with the terrain simulation medium for extending the deformability of the therapeutic surface to the interlocking zone.

2. The device of claim 1 wherein
the base is adapted for communication with an underlying surface; and
the terrain surface panel defines an outer therapeutic surface, the therapeutic surface on an exterior of the flexible shell opposed from the base and adapted for engaging a patient, the therapeutic surface having a deformability limited by the terrain simulation medium for providing an ambulatory resistance to patient imposed downward force.

3. The device of claim 1 wherein the terrain simulation medium further comprises: a plurality of filler objects, each of the filler objects having a size and a texture for slidable communication with adjacent filler objects of the plurality of filler objects, the filler objects adapted for exerting a compressive force in response to deformation of the terrain surface panel.

4. The device of claim 1 wherein the sidewall is adapted to exert a resilient force against the deformation less than that exerted by the terrain simulation medium.

5. The device of claim 1 wherein the protrusions define a region of greater cross section tapered to a region of lesser cross section.

6. The device of claim 1 wherein each of the protrusions have a region of lesser cross section and a region of a greater cross section, the region of reduced cross section proximate to the void and the region of greater cross section distal from the void, the region of greater cross section configured to engage in an interference fit with the region of greater cross section of the adjacent modular terrain element.

7. The device of claim 1 wherein the base and the terrain simulation panel are formed of a same material.

8. A system for ambulatory gait training, comprising:
a plurality of a modular terrain elements, each modular terrain element including:
a pair of opposed planar surfaces including a base and a terrain surface panel, the base and terrain surface panel enclosing a void containing a terrain simulation medium, at least one of the opposed planar surfaces being flexible for accommodating deformation based on the terrain simulation medium enclosed in the void;
the base adapted for communication with an underlying surface;
a sidewall coupling the base and terrain surface panel along an aligned perimeter for enclosing a flexible shell around the void the terrain simulation medium defined by a plurality of filler objects having a size and texture based on a terrain type to be simulated;
the terrain surface panel defining a therapeutic surface, the terrain surface panel opposed from the base and having an upward facing side adapted for engaging a patient, the therapeutic surface having a perimeter adapted for coupling to an adjacent modular terrain element;
the void containing and enclosing the terrain simulation medium; and
a plurality of engaging structures along the perimeter and adapted to engage a sidewall of an adjacent modular terrain element for forming a continuous simulated terrain surface, each engaging structure of the plurality of engaging structures defining an interlocking zone, the interlocking zone receptive to the engaging structures from an adjacent modular terrain element,
the void extending into an interior of the engaging structures, the void and the interior of the engaging structures forming a continuous volume filled with the terrain simulation medium for extending the deformability of the therapeutic surface to the interlocking zone.

9. The system of claim 8 wherein the engaging structures of one of the modular terrain elements form a tessellation with the engaging structures of an adjacent modular terrain element.

10. The system of claim 8 wherein the therapeutic surface has a deformability limited by the terrain simulation medium for providing an ambulatory resistance to patient imposed downward force.

11. The system of claim 8 wherein each of the filler objects has a size and a texture for slidable communication with adjacent filler objects of the plurality of filler objects, the filler objects adapted for exerting a compressive force in response to deformation of the opposed planar surfaces.

12. The system of claim 8 wherein the sidewall is adapted to exert a resilient force against the deformation less than that exerted by the terrain simulation medium.

13. A modular, ambulatory surface apparatus for selective terrain based simulation, comprising:
a modular terrain element including:
a pair of opposed planar surfaces including a base and a terrain surface panel, the base and terrain surface panel enclosing a void containing a terrain simulation medium, at least one of the opposed planar surfaces being flexible for accommodating deformation based on the terrain simulation medium enclosed in the void;
the base adapted for communication with an underlying surface;
a sidewall coupling the base and terrain surface panel along an aligned perimeter for enclosing a flexible shell around the void, the terrain simulation medium defined by a plurality of filler objects having a size and texture based on a terrain type to be simulated;
the terrain surface panel defining a therapeutic surface, the terrain surface panel opposed from the base and having an upward facing side adapted for engaging a patient, the therapeutic surface having a perimeter adapted for coupling to an adjacent modular terrain element;
the void containing and enclosing the terrain simulation medium; and
a plurality of engaging structures along the perimeter and adapted to engage a sidewall of an adjacent modular terrain element for forming a continuous simulated terrain surface, each engaging structure of the plurality of engaging structures defining an interlocking zone, the interlocking zone receptive to the engaging structures from an adjacent modular terrain element,
the void extending into an interior of the engaging structures, the void and the interior of the engaging structures forming a continuous volume filled with the terrain simulation medium for extending the deformability of the therapeutic surface to the interlocking zone.

* * * * *